US008041847B1

(12) United States Patent
Smith (10) Patent No.: US 8,041,847 B1
(45) Date of Patent: Oct. 18, 2011

(54) PERIODIC AND CONDITIONAL EXECUTION OF DMA OPERATIONS

(75) Inventor: Ronald Smith, Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 508 days.

(21) Appl. No.: 12/118,566

(22) Filed: May 9, 2008

Related U.S. Application Data (60) Provisional application No. 60/917,182, filed on May 10, 2007, provisional application No. 60/940,232, filed on May 25, 2007.

(51) Int. Cl.
*G06F 13/28* (2006.01)
(52) U.S. Cl. ............................. 710/22; 710/24
(58) Field of Classification Search .................. 710/22, 710/24
See application file for complete search history.

(56) References Cited

U.S. PATENT DOCUMENTS

| | | | | |
|---|---|---|---|---|
| 5,179,665 A | * | 1/1993 | Roslund et al. | 709/215 |
| 6,041,060 A | * | 3/2000 | Leichty et al. | 370/412 |
| 6,625,689 B2 | * | 9/2003 | Narad et al. | 711/110 |
| 6,854,116 B1 | * | 2/2005 | Anderson et al. | 718/100 |
| 7,076,578 B2 | * | 7/2006 | Poisner et al. | 710/52 |
| 7,698,473 B2 | * | 4/2010 | Yamazaki et al. | 710/22 |
| 7,707,321 B2 | * | 4/2010 | Lee et al. | 710/1 |
| 2007/0033376 A1 | * | 2/2007 | Sinclair et al. | 711/203 |

OTHER PUBLICATIONS

Scheduling Periodic and Aperiodic Tasks Using Slack Stealing Algorithm Lehoczky et al. Published 1995.*
"Universal Serial Bus Specification", Revision 2.0, USB Implementers Forum Inc., Apr. 27, 2000.

* cited by examiner

*Primary Examiner* — Henry Tsai
*Assistant Examiner* — Eric Oberly (57) ABSTRACT

Scheduling Direct Memory Access (DMA) operations. Blocks are provided in a first DMA chain, with each block in the first DMA chain corresponding to an operation and comprising a pair of pointers, a first pointer pointing to a command structure to be executed or a data structure to be moved, and a second pointer pointing to a next block in the first DMA chain. A DMA engine processes successive operations in the first DMA chain. Time remaining in an interval for processing the first DMA chain is tracked. A second DMA chain of conditional blocks are maintained, with each conditional block corresponding to a conditional operation and containing an estimate of time needed to complete the conditional operation. A conditional operation is executed from the second DMA chain if the remaining time in the interval is greater than the estimated time to complete processing of the conditional operation.

16 Claims, 9 Drawing Sheets

PERIODIC AND CONDITIONAL EXECUTION OF DMA OPERATIONS

CROSS-REFERENCE TO RELATED APPLICATIONS

This application claims the benefit of U.S. Provisional Patent Application No. 60/917,182, filed May 10, 2007, and U.S. Provisional Patent Application No. 60/940,232, filed May 25, 2007, the contents of which are hereby incorporated by reference as if fully stated herein.

FIELD

The present disclosure generally concerns periodic scheduling of functions for processing by a DMA engine.

BACKGROUND

In NAND memory technology, the difficulty of scheduling operations often depends on the application. In single data stream environments, for example, scheduling reading and writing may not necessarily be difficult as long as the system can account for sufficiently high read/write bandwidths. In more complex environments, however, there may be multiple data streams being read and written to/from the NAND memory, with each stream having its own timing requirements. In such an environment, optimization in scheduling is not nearly as simple, because of the conflicting requirements between the streams and the various timings required to read, write or erase a page.

Moreover, numerous asynchronous operations complicate the real-time needs of a media system. For example, "garbage collection", in which a NAND platform reclaims unused or stale resources, can cause large deviations from a real-time schedule. Thus, to globally optimize performance, it is necessary to create a real-time schedule for such asynchronous operations.

One method to schedule such operations is to use the OS. However, this consumes system processor resources, and may complicate the power model for power-sensitive applications, such as in portable devices. Moreover, depending on the load that is being processed by the system processor, there may be considerable uncertainty in when the system processor is able to schedule such operations.

SUMMARY

In consideration of the above, one way to support such a periodic schedule is to use a DMA which supports block chaining and conditional execution of DMA blocks. Accordingly, one or more embodiments of the present invention allow for DMA hardware optimization of real-time scheduling, while conditionally processing asynchronous functions at opportunistic timings.

Thus, in one aspect, the disclosure provides scheduling of Direct Memory Access (DMA) operations in a NAND memory environment. Blocks in a first DMA chain are provided, each block in the first DMA chain corresponding to an operation and comprising a pair of pointers, a first pointer of the pair of pointers pointing to a command structure to be executed or a data structure to be moved, and a second pointer of the pair of pointers pointing to a next block in the first DMA chain. A DMA engine is used to process successive operations in the first DMA chain. Time remaining in an interval for processing the first DMA chain is tracked. A second DMA chain of conditional blocks is maintained, each conditional block corresponding to a conditional operation and containing an estimate of time needed to complete processing the conditional operation. A given conditional operation from the second DMA chain is executed if the remaining time in the interval for processing the first DMA chain is greater than the estimated time to complete processing of the given conditional operation.

By virtue of this arrangement, it is typically possible to optimize real-time scheduling of operations using DMA hardware, while conditionally processing asynchronous functions at opportunistic timings. Thus, the OS or system processor is relieved of having to "baby-sit" scheduling, thereby reducing power requirements and improving overall processing speed.

In another example aspect, means for scheduling Direct Memory Access (DMA) operations in a NAND memory environment are provided. Block providing means provide blocks in a first DMA chain, each block in the first DMA chain corresponding to an operation and comprising a pair of pointers, a first pointer of the pair of pointers pointing to a command structure to be executed or a data structure to be moved, and a second pointer of the pair of pointers pointing to a next block in the first DMA chain. A DMA processing means processes successive operations in the first DMA chain. A counting means tracks time remaining in an interval for processing the first DMA chain. A second DMA chain of conditional blocks is maintained, each conditional block corresponding to a conditional operation and containing an estimate of time needed to complete processing the conditional operation. The DMA processing means executes a given conditional operation from the second DMA chain if the remaining time in the interval for processing the first DMA chain is greater than the estimated time to complete processing of the given conditional operation.

In yet another example aspect, a computer-executable program stored on a computer-readable medium causes a computer to schedule Direct Memory Access (DMA) operations in a NAND memory environment. The program causes the computer to provide blocks in a first DMA chain, each block in the first DMA chain corresponding to an operation and comprising a pair of pointers, a first pointer of the pair of pointers pointing to a command structure to be executed or a data structure to be moved, and a second pointer of the pair of pointers pointing to a next block in the first DMA chain. The program further causes the computer to use a DMA engine to process successive operations in the first DMA chain. In addition, the program causes the computer to track time remaining in an interval for processing the first DMA chain. The program causes the computer to maintain a second DMA chain of conditional blocks, each conditional block corresponding to a conditional operation and containing an estimate of time needed to complete processing the conditional operation. The program additionally causes the computer to execute a given conditional operation from the second DMA chain if the remaining time in the interval for processing the first DMA chain is greater than the estimated time to complete processing of the given conditional operation.

A more complete understanding can be obtained by reference to the following detailed description and to the attached drawings.

DETAILED DESCRIPTION

Figure 1:
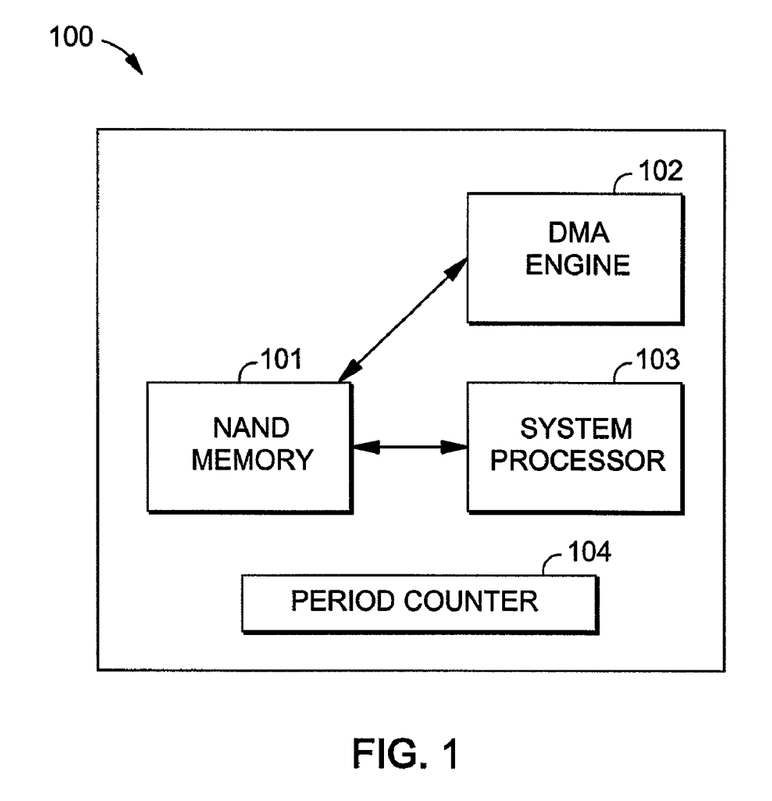
FIG. 1 is a block diagram of an example platform in which aspects of the present disclosure may be practiced.

FIG. 1 depicts a block diagram of an example platform in which aspects of the present disclosure may be practiced.

As shown in FIG. 1, platform 100 includes NAND memory 101, DMA engine 102, system processor 103, and period counter 104. Platform 100 can be embodied in various devices, such as a PDA (personal digital assistant), laptop computer, digital audio player, digital camera, mobile phone, replacement hard drive, or any other device that can make use of NAND memory. In one implementation, platform 100 is used to process media streams, such as video or audio.

In one implementation, NAND memory 101 is a non-volatile, solid-state computer memory that can be electrically erased and reprogrammed. NAND memory is commonly used in memory cards and flash drives (thumb drives, handy drive, memory stick, flash stick, jump drive, "Cap N' Go") for general storage and transfer of data between computers and other digital products. NAND memory is a specific type of EEPROM (Electrically Erasable Programmable Read-Only Memory) that is erased and programmed in large blocks.

DMA engine 102 is a microcontroller or other hardware which performs DMA transactions to and from a memory, ordinarily offloading some of these responsibilities from a system processor. DMA engine 102 can also perform functions and commands, such as erasing or reading blocks from memory. In one implementation, DMA engine 102 processes successive operations in a chain of DMA command blocks, where each command block includes a first pointer to an operation to be performed or data to be moved, and a second pointer to the next command block. DMA engine 102 may also include a separate DMA channel conditional chain processing list mechanism (not shown) to allow for a conditional execution list to be consumed separately from the main list. Each of these processes will be described in more detail below.

In one implementation, system processor 103 is a CPU processor which processes requests on behalf of an operating system or applications, and communicates with NAND memory 101. System processor 103 may compete with DMA engine 102 for access to blocks of NAND memory 101. A single CPU processor 103 is depicted in FIG. 1, however, a plurality of system processors may be included in platform 100 and communicate with NAND memory 101. In general, a system processor can also be referred to as an "application processor", or simply a "processor".

In one implementation, period counter 104 is a counter device which defines a period for processing data for a specific application, and then uses this information to define the length of chains of operations for DMA engine 102. DMA engine 102 automatically jumps to the next command chain from the current block location upon the start of the new period. Thus, period counter 104 automatically restarts processing a new DMA chain based on a regular time interval. In one implementation, period counter 104 provides a control signal to DMA engine 102 once a given period expires, in order to signal DMA engine 102 to start the next chain.

Optimally, the period scheduling fits as many operations in a period as possible, without "overflowing" the period by adding more operations than can be handled during the period. The periodicity of period counter 104 is determined by the application and/or the type of media being processed, as well as the size of NAND memory 101. For example, streaming video may require a longer period length, whereas inputting raw data may require a different period length. See USB 2.0 Specification, USB Implementers Forum Inc., Apr. 27, 2000, and in particular Chapter 5, regarding "USB Data Flow Model". Period counter 104 is shown as a separate element in FIG. 1, but could also be implemented within DMA engine 102 or other hardware. A wide variety of counters exist, and the disclosure is not limited to any particular hardware, software, or firmware implementation.

Examples of linked lists of command blocks will now be described with respect to FIGS. 2 to 4.

Figure 2:
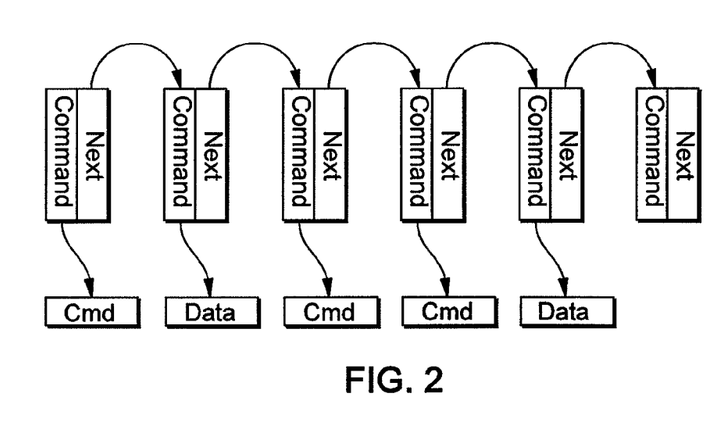
FIG. 2 illustrates an example of a direct memory access (DMA) chain.
Figure 3:
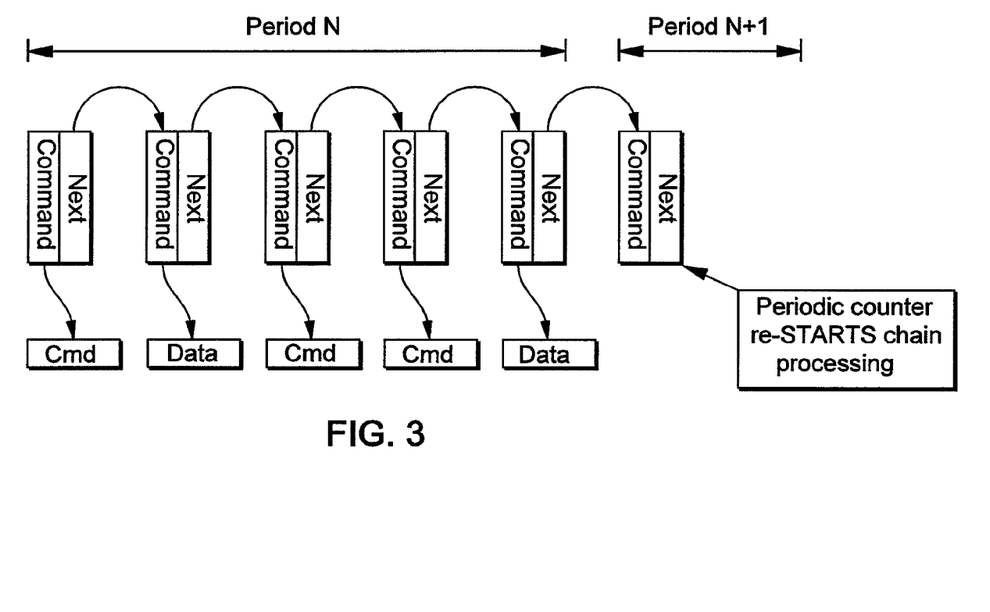
FIG. 3 illustrates another example of a DMA chain.

FIG. 2 shows an example of a DMA chain. Each block in the DMA chain consists of pairs of pointers. The first pointer points to an operation (or command structure) to be executed or a data structure to be moved, and a second pointer points to the next DMA block in the DMA chain. This chaining can essentially continue without limit up to a last operation in the DMA chain, where the next pointer includes a "STOP" flag. The "STOP" flag is an indicator to DMA engine 102 of the end of the currently scheduled chain, and is also an indicator to DMA engine 102 to begin the next period by automatically starting the next command chain and continuing with processing. In one implementation, the DMA chains exist in global memory. The DMA chains are set up by various drivers and the operating system as the drivers and operating systems execute. For example, the operating system will add blocks to the DMA chains for file I/O.

The order of commands or command pointers and the next pointer is not important. A DMA engine 102 may be implemented such that the command, next pointer, the STOP flag and any other flags may be arranged in any combination. Alternatively, each field may be identified with a field type so that the block fields may be in any order. In addition, the blocks of a given DMA chain need not be contiguous. For example, there may be gaps between the blocks or the blocks may be scattered in system memory.

Period counter 104 determines the periodic frame. Whenever the period expires, the DMA chain processing is restarted from where it left off in the chain. This means that the last DMA chain operation must contain a NEXT OPERATION pointer as well as the STOP function. This is shown in FIG. 3.

Figure 4:
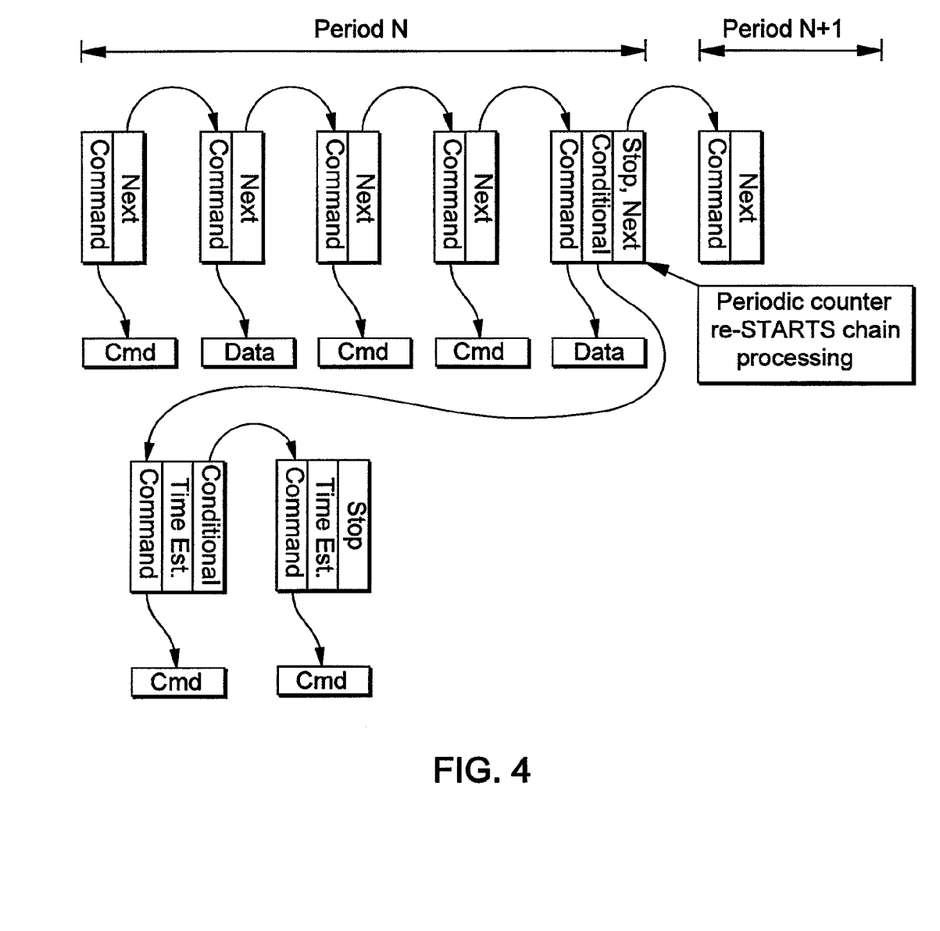
FIG. 4 illustrates another example of a DMA chain.

FIG. 4 illustrates conditional block chaining. Period counter 104, which measures the inter-period interval, necessarily "knows" (or tracks) the time remaining in any given period. In addition, there is a separate list of conditional operations (or asynchronous operations), each of which contains an estimate of the time needed to complete the conditional operation. At the end of the non-conditional scheduled chain (i.e., the block with the STOP flag), this conditional operation list is pointed to. If the remaining time being tracked by the periodic counter 104 is greater than the indicated time estimate (of a conditional operation), the conditional operation is executed and the conditional operation is marked as consumed.

In this way, the system processor can maintain the periodic and asynchronous lists as two separately maintained lists, and execute the asynchronous operations conditionally as a "subroutine". Thus, rather than simply sitting idle at the end of a scheduled chain until the period expires, DMA engine 102 can conditionally execute asynchronous operations during this time. In addition, by monitoring the asynchronous list execution pointers, the system processor can reclaim executed command blocks and supply current conditional pointers to new periodic entries. In one implementation, the conditional chain blocks also contain "STOP" flags, thus signaling DMA engine 102 to return to the scheduled list and wait, or to jump to another list of conditional operations.

Figure 5:
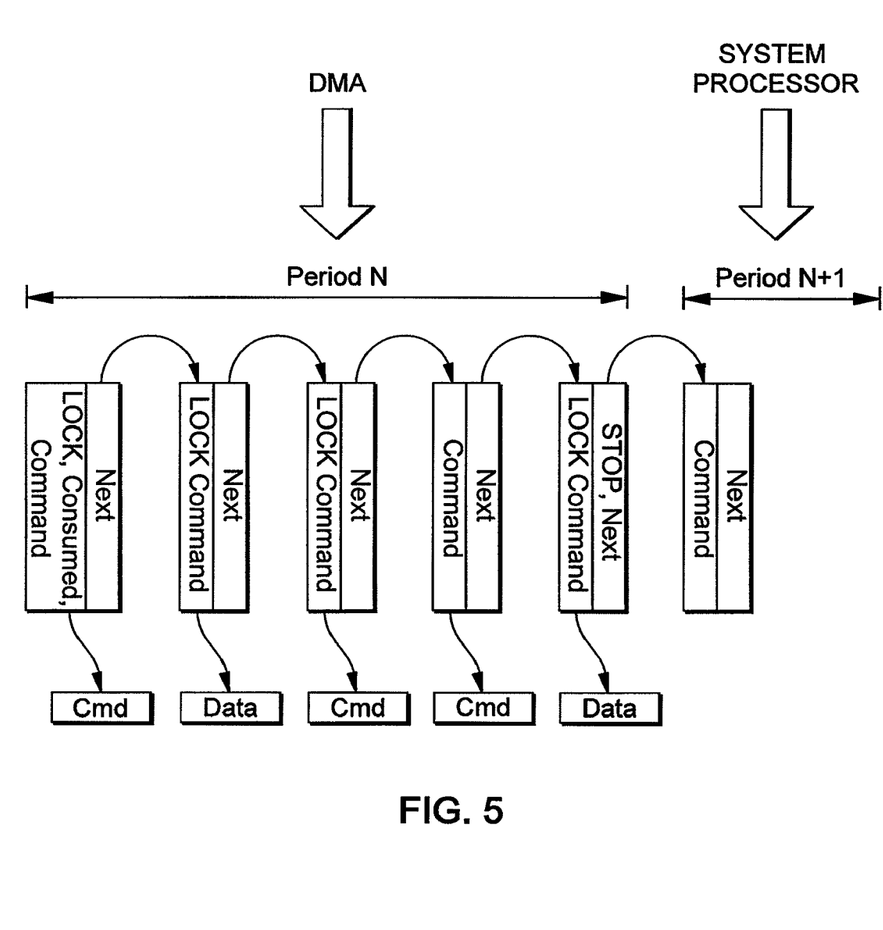
FIG. 5 illustrates another example of a DMA chain.

By definition, all operations in the periodic schedule must be executed within the period, and none of the conditional commands may be executed as part of the periodic schedule. Additionally, in order to maintain consistency of the file system, there needs to be a mechanism to track those conditional operations that are executed from conditional operations that are not executed. For example, DMA engine 102 may return to the same conditional chain several times from various scheduled chains and, therefore, DMA engine 102 needs a way to know which operations in the conditional chain have already been executed. In one implementation, a "consumption" semaphore is used to indicate whether a conditional block has been executed, and is contained within the block. Thus, DMA engine 102 can tell whether a block has been processed as DMA engine 102 moves throughout the conditional list. FIG. 5 shows an example of a consumption semaphore, marking the first block as consumed.

In addition, to support the insertion of new operations into either the periodic schedule or the conditional schedule, the memory system must support atomic operations. In particular, system processor 103 must be able to claim the current block exclusively, in order to update the pointer to point to a new block. Conversely, DMA engine 102 must be able to claim the current pointer and exclude the system processor in order to perform each operation.

Accordingly, one system of locking and unlocking blocks in a DMA chain will now be described with respect to FIG. 5. FIG. 5 depicts how DMA engine 102 processes a DMA chain when system processor 103 is locking the end of the DMA chain for the purpose of inserting a asynchronous request into the current period.

In one implementation, locking and unlocking of blocks in the DMA chain is accomplished using "exclusion" semaphores. In particular, an exclusion semaphore can indicate whether another entity is already using the DMA block, and thus DMA engine 102 or system processor 103 simply needs to access the exclusion semaphore value to "see" (or check) whether the DMA block's lock has been set. In one implementation, these locks exist in global memory. When DMA engine 102 fetches a command block, DMA engine 102 locks that command block, meaning that DMA engine 102 "owns" that command block. If DMA engine 102 fails in locking the command block, then the command block has been locked by another resource, which is usually system processor 103. For example, system processor 103 may be locking a block so that system processor 103 can update that block's pointer in order to insert a new block into the chain.

When the DMA engine 102 accesses a DMA block and sees the lock has been set, DMA engine 102 can do one of two things. The first thing is to assume that the time that the lock is set will be small and repeatedly fetch the DMA block, waiting for the lock to reset. This consumes resource bandwidth on repeated fetches and is only practical if the lock set time is guaranteed to be small. The second possibility is that DMA engine 102 can monitor the bus (or "snoop") for any write to the current block location. Then, when a write address is sent to the system memory that matches the current block address, DMA engine 102 presumes that this address is clearing the lock, and proceeds to refetch the block. This requires that the DMA engine 102 and system processor 103 be on a coherent memory bus.

Thus, using either of these methods, the system can ensure that DMA engine 102 and system processor 103 are not both accessing a DMA block at the same time. Accordingly, the coherency of the block and corresponding chain can be maintained.

Figure 6:
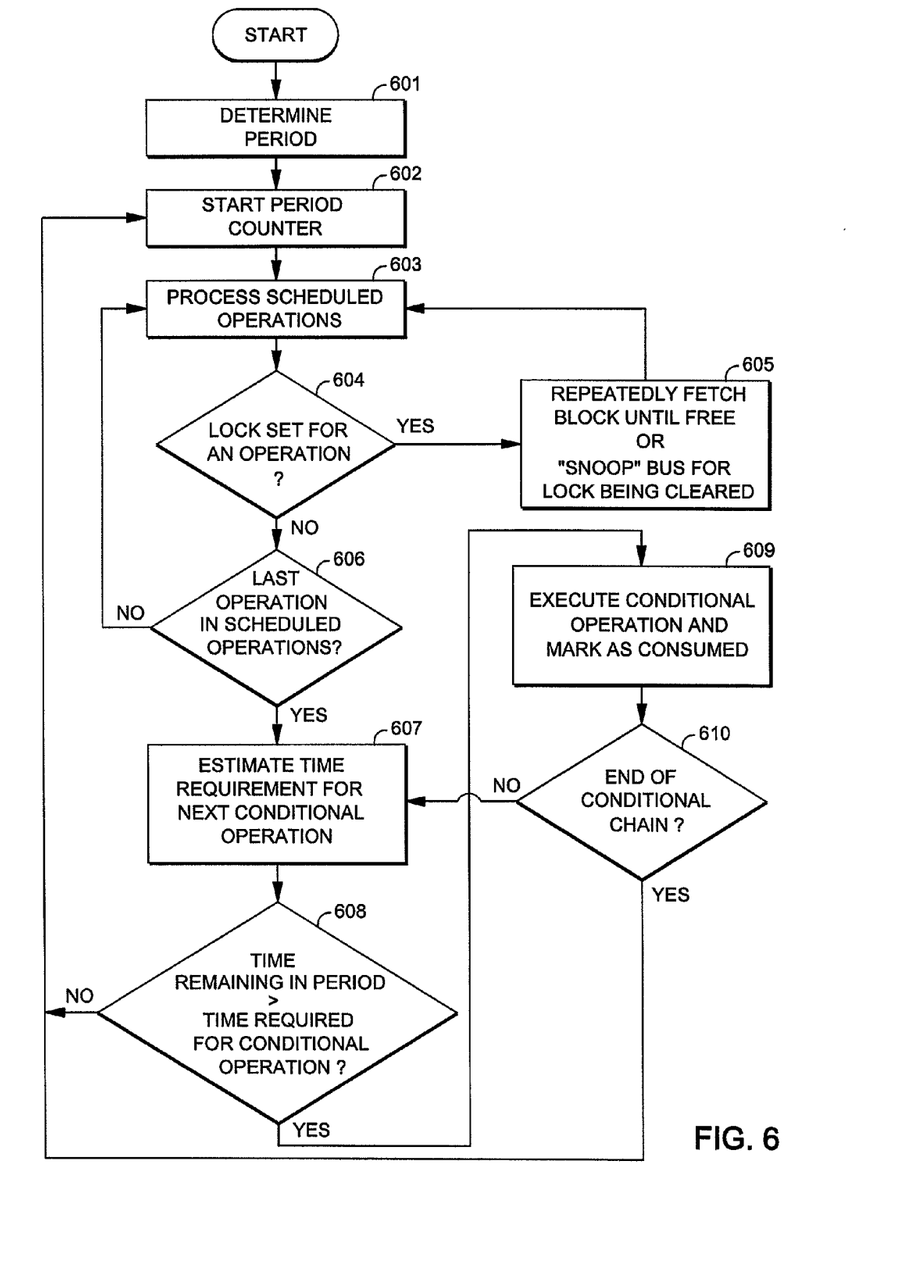
FIG. 6 is a flowchart illustrating an example process for periodic and conditional execution of DMA blocks.

FIG. 6 shows a flowchart of an example process for periodic and conditional execution of DMA blocks according to one implementation of the present disclosure.

In step 601, the period is determined for period counter 104. In one implementation, the period is based on the application. For example, one period may work best for reading and storing a video stream, whereas a different period may work best for writing an audio stream.

In step 602, period counter 104 starts counting the period for the current DMA chain.

In step 603, DMA engine 102 begins processing the operations in the scheduled DMA chain. As discussed above, all scheduled operations must be processed before any conditional operations are processed.

In step 604, DMA engine 102 determines whether a current operation is locked by system processor 103. In one implementation, this is accomplished by viewing a semaphore associated with the block, as discussed above. If DMA engine 102 encounters a lock for a given block, the process proceeds to step 605. Otherwise, the process proceeds to step 606.

In step 605, DMA engine 102 uses one of two options to obtain possession of (fetch) the locked block, based on the settings and/or design of the system. As discussed above, DMA engine 102 can repeatedly attempt to fetch the block, or can monitor the bus or "snoop" for any write to the current block location. Either of these processes will eventually gain control of the block for DMA engine 102.

In step 606, DMA engine 102 determines whether it has encountered the last scheduled operation. In one implementation, this is denoted by a STOP flag in the last operation, as shown in FIGS. 4 and 5. If DMA engine 102 has not encountered the last scheduled operation, the process proceeds back to step 603 to continue processing the scheduled operations in the chain. If, on the other hand, DMA engine 102 has encountered the last operation, the process proceeds to step 607.

In step 607, DMA engine 102 estimates the time required for the next conditional operation. In one implementation, DMA engine 102 determines the "next" conditional operation by traversing the chain of conditional DMA blocks and checking a flag or semaphore in each block indicating whether the corresponding operation has already been executed. In another implementation, the conditional blocks may simply be deleted once executed, and thus DMA engine 102 simply goes to the first block in the conditional chain. At any rate, once DMA engine 102 reaches the next un-executed conditional block, DMA engine 102 estimates the time required to perform that block's operation, using time estimate information contained in the conditional DMA block.

In step 608, DMA engine 102 compares the time remaining in period counter 104 with the estimated time required for performing the conditional operation. In other words, DMA engine 102 determines whether there is enough time left in the period to complete the conditional operation. If there is not enough time left to perform the conditional operation, the process proceeds back to step 602 to re-start period counter 104 for the next set of scheduled operations. Thus, in this situation, no conditional operations are performed. On the other hand, if there is enough time left to perform the conditional operation, the process proceeds to step 609 to perform the conditional operation(s).

In step 609, the conditional operation is executed, and the corresponding conditional DMA block is marked as consumed. As discussed above, the block may be marked as consumed by toggling a consumption semaphore in the block. Thus, DMA engine 102 can subsequently determine that this operation has already been completed while traversing for conditional operations.

In step 610, DMA engine 102 determines whether the end of the conditional chain of blocks has been reached. In one implementation, a conditional chain block may include a "STOP" flag like the scheduled blocks, thus notifying DMA engine 102 that the conditional chain is complete. If so, then there is no need to perform any more conditional operations, and the process proceeds to step 602 to re-start period counter 104 for the next set of scheduled operations. If there are still blocks left in the conditional chain whose operations have not been processed, the process proceeds back to step 607, where DMA engine 102 estimates the time required for the next conditional operation.

As an additional option, DMA engine 102 and period counter 104 may implement some type of overflow detection to account for period overflow. In this regard, although overflow should not occur during operation, there is always a possibility that an error might occur. Accordingly, the system can implement signaling when DMA engine 102 determines that it is still processing a previous list in a new period, so as to inform system processor 103 to implement a contingency code or other type of error recovery.

By virtue of the above-described example embodiments, it is typically possible to optimize real-time scheduling of operations using DMA hardware, while conditionally processing asynchronous functions at opportunistic timings. Thus, the OS or system processor is relieved of having to "baby-sit" scheduling, thereby reducing power requirements and improving overall processing speed.

Figure 7A:
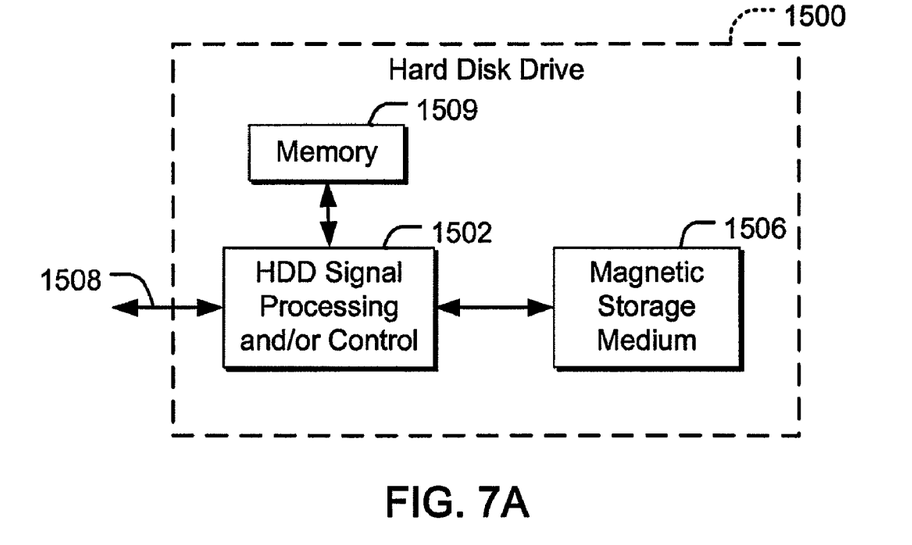
FIG. 7A is a block diagram showing an example embodiment in a hard disk drive (HDD).

Referring now to FIGS. 7A-7H, various exemplary implementations of the present invention are shown. Referring to FIG. 7A, the present invention may be embodied for coordinating scheduling in a hard disk drive (HDD) 1500. The present invention may implement either or both signal processing and/or control circuits, which are generally identified in FIG. 7A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 7B:
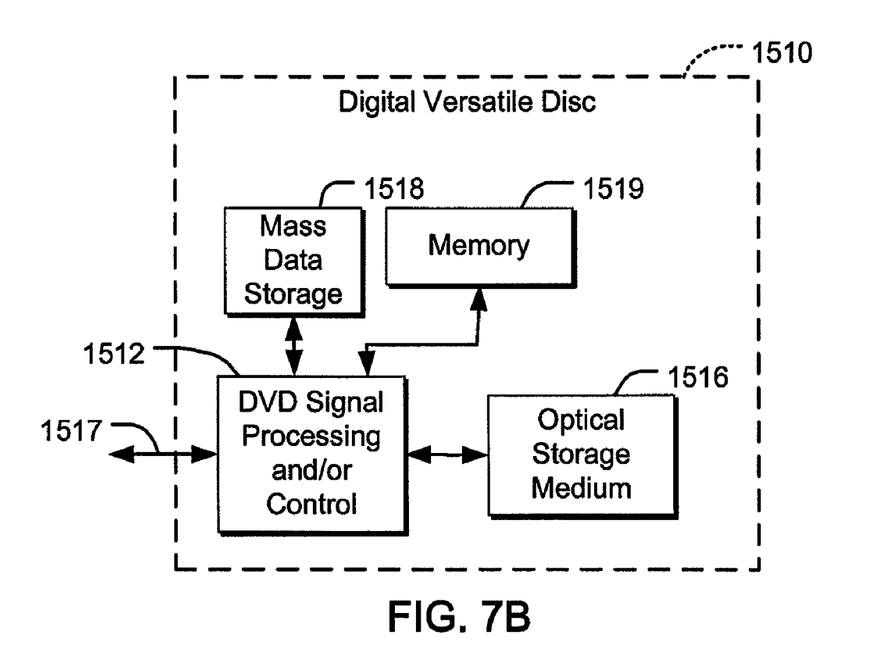
FIG. 7B is a block diagram of an example embodiment in a digital versatile disc (DVD) drive.

Referring now to FIG. 7B, the present invention may be embodied for coordinating scheduling in a digital versatile disc (DVD) drive 1510. The present invention may implement either or both signal processing and/or control circuits, which are generally identified in FIG. 7B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 7A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 7C:
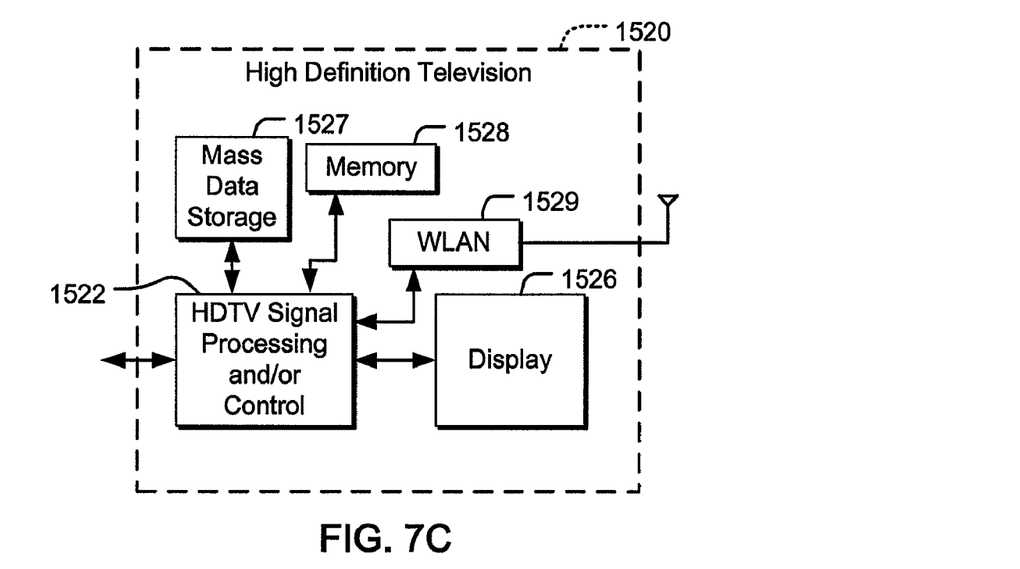
FIG. 7C is a block diagram of an example embodiment in a high definition television (HDTV).

Referring now to FIG. 7C, the present invention may be embodied for coordinating scheduling in a high definition television (HDTV) 1520. The present invention may implement either or both signal processing and/or control circuits, which are generally identified in FIG. 7C at 1522, a WLAN interface 1529 and/or mass data storage 1527 of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/ or perform any other type of HDTV processing that may be required.

HDTV 1520 may communicate with mass data storage 1527 that stores data in a nonvolatile manner such as optical and/or magnetic storage devices. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN interface 1529.

Figure 7D:
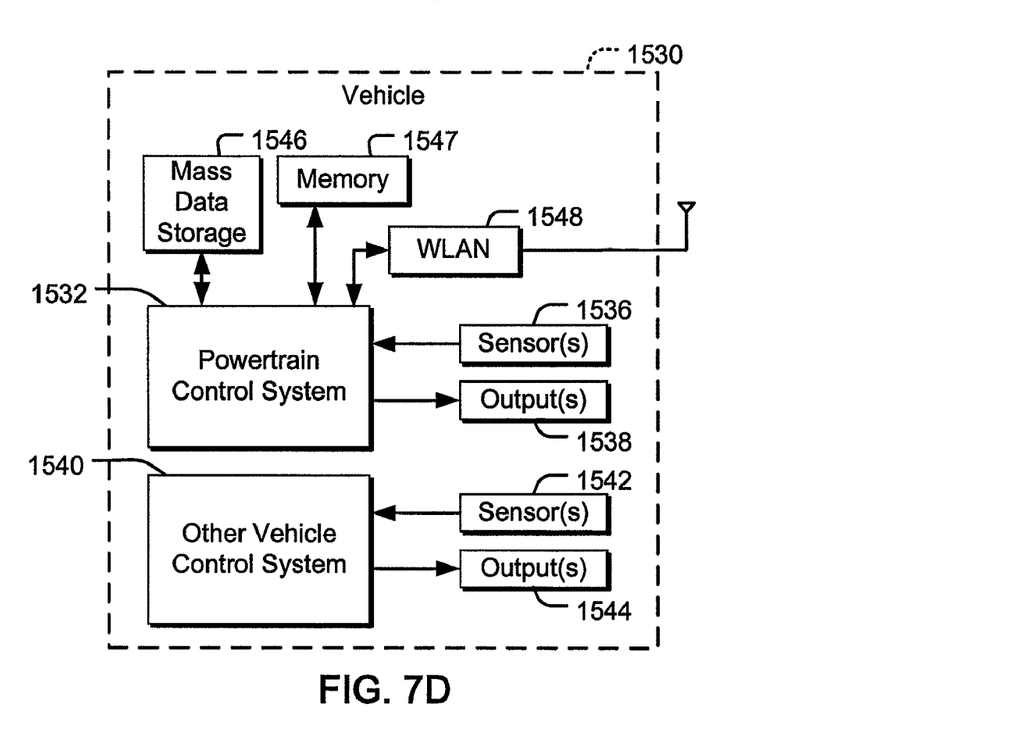
FIG. 7D is a block diagram of an example embodiment in a vehicle.

Referring now to FIG. 7D, the present invention may be embodied for coordinating scheduling in a control system of a vehicle 1530, a WLAN interface 1548 and/or mass data storage 1546 of the vehicle 1530. In some implementations, the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN interface 1548. The control system 1540 may also include mass data storage, memory and/or a WLAN interface (all not shown).

Figure 7E:
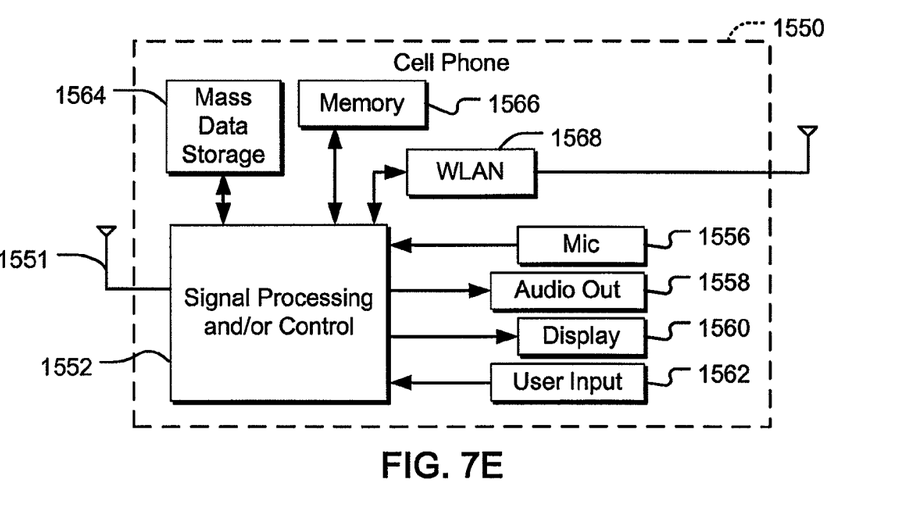
FIG. 7E is a block diagram of an example embodiment in a cellular or mobile phone.

Referring now to FIG. 7E, the present invention may be embodied for coordinating scheduling in a cellular phone 1550 that may include a cellular antenna 1551. The present invention may implement either or both signal processing and/or control circuits, which are generally identified in FIG. 7E at 1552, a WLAN interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN interface 1568.

Figure 7F:
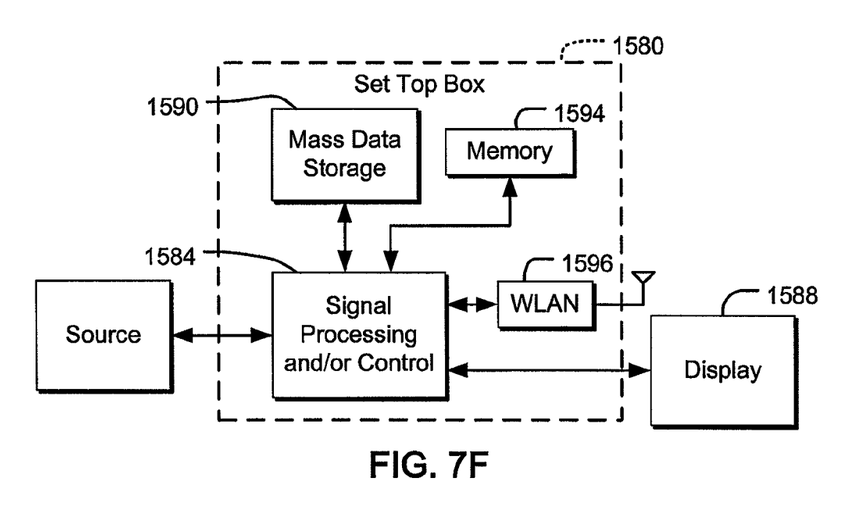
FIG. 7F is a block diagram of an example embodiment in a set-top box.

Referring now to FIG. 7F, the present invention may be embodied for coordinating scheduling in a set top box 1580. The present invention may implement either or both signal processing and/or control circuits, which are generally identified in FIG. 7F at 1584, a WLAN interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN interface 1596.

Figure 7G:
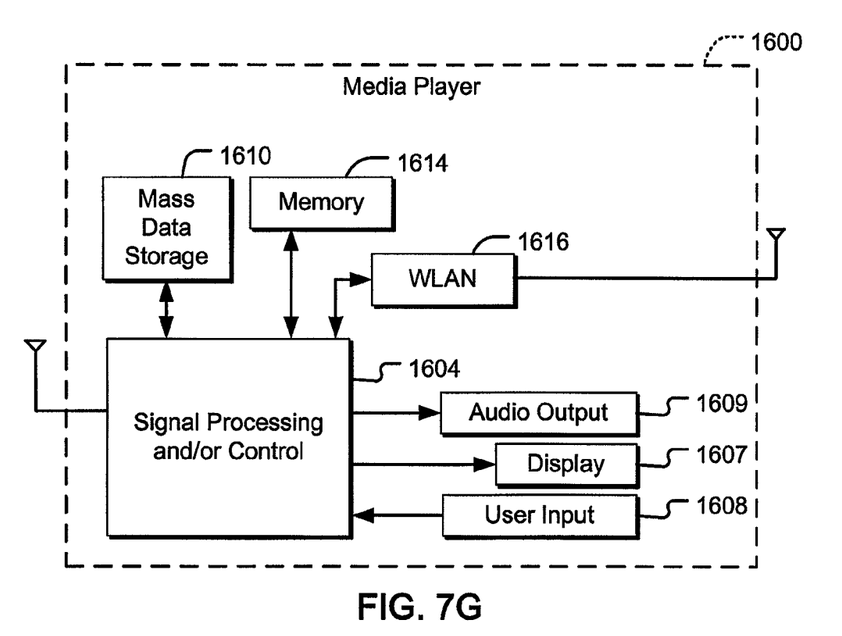
FIG. 7G is a block diagram of an example embodiment in a media player.

Referring now to FIG. 7G, the present invention may be embodied for coordinating scheduling in a media player 1600. The present invention may implement either or both signal processing and/or control circuits, which are generally identified in FIG. 7G at 1604, a WLAN interface 1616 and/or mass data storage 1610 of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via WLAN interface 1616. Still other implementations in addition to those described above are contemplated.

Figure 7H:
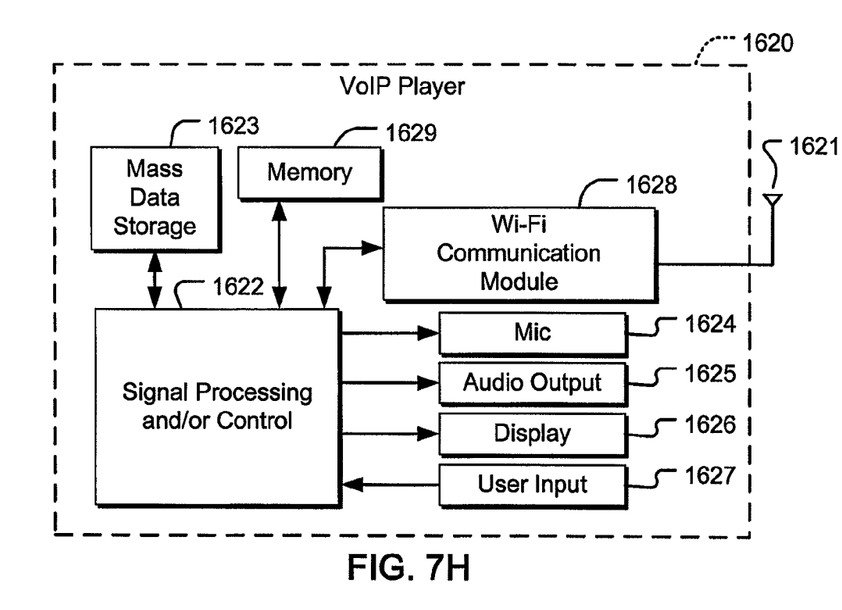
FIG. 7H is a block diagram of an example embodiment in a Voice-over Internet Protocol (VoIP) player.

Referring to FIG. 7H, the present invention may be embodied for coordinating scheduling in a Voice over Internet Protocol (VoIP) phone 1620 that may include an antenna 1621. The present invention may implement either or both signal processing and/or control circuits, which are generally identified in FIG. 7H at 1622, a wireless interface and/or mass data storage of the VoIP phone 1620. In some implementations, VoIP phone 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP phone 1620 may process data, perform coding and/or encryption, perform calculations, format data and/or perform other VoIP phone functions.

VoIP phone 1620 may communicate with mass data storage 1623 that stores data in a nonvolatile manner such as optical and/or magnetic storage devices, for example, hard disk drives and/or DVD drives. At least one HDD may have the configuration shown in FIG. 7A and/or at least one DVD drive may have the configuration shown in FIG. 7B. The HDD may be a mini HDD that includes one or more platters having a diameter that is smaller than approximately 1.8". VoIP phone 1620 may be connected to memory 1629, which may be a RAM, ROM, low latency nonvolatile memory such as flash memory and/or other suitable electronic data storage. VoIP phone 1620 is configured to establish communications link with a VoIP network (not shown) via Wi-Fi communication module 1628.

Example aspects of the disclosure have been described above with respect to particular illustrative embodiments. It is understood that the disclosure is not limited to the above-described example embodiments and that various changes and modifications may be made without departing from the scope of the disclosure. For example, one or more steps of methods discussed above may be performed in a different order (or concurrently) and still achieve desirable results.

What is claimed is:

1. A method of scheduling Direct Memory Access (DMA) operations in a NAND memory environment, the method comprising:
   providing blocks in a first DMA chain, each block in the first DMA chain corresponding to an operation and comprising a pair of pointers, a first pointer of the pair of pointers pointing to a command structure to be executed or a data structure to be moved, a second pointer of the pair of pointers pointing to a next block in the first DMA chain;
   using a DMA engine to process successive operations in the first DMA chain, wherein the DMA engine tracks whether a conditional operation has already been executed by checking a consumption semaphore included in the corresponding conditional block;
   tracking time remaining in an interval for processing the first DMA chain;
   maintaining a second DMA chain of conditional blocks, each conditional block corresponding to a conditional operation and containing an estimate of time needed to complete processing the conditional operation; and
   executing a given conditional operation from the second DMA chain if the remaining time in the interval for processing the first DMA chain is greater than the estimated time to complete processing of the given conditional operation.

2. The method according to claim 1, wherein a last block in the first DMA chain points to the second DMA chain.

3. The method according to claim 1, wherein each block in the first DMA chain and the second DMA chain includes an exclusion semaphore for preventing the DMA engine from executing an operation associated with the block.

4. The method according to claim 3, wherein if the DMA engine is prevented from executing an operation associated with a given block, the DMA engine repeatedly attempts to fetch the given block until the given block is reset.

5. The method according to claim 3, wherein if the DMA engine is prevented from executing an operation associated with a given block, the DMA monitors a bus for any write to a location of the given block, and attempts to refetch the given block if such a write is detected.

6. The method according to claim 1, wherein a length of the interval is set based on an application being executed.

7. The method according to claim 1, wherein upon expiration of the interval, the DMA engine begins processing a next scheduled DMA chain.

8. The method according to claim 1, wherein a system processor monitors the second DMA chain and reclaims executed blocks of the second DMA chain in order to supply conditional pointers to new conditional blocks.

9. An apparatus for scheduling Direct Memory Access (DMA) operations in a NAND memory environment, the apparatus comprising:
   a block providing unit configured to provide blocks in a first DMA chain, each block in the first DMA chain corresponding to an operation and comprising a pair of pointers, a first pointer of the pair of pointers pointing to a command structure to be executed or a data structure to be moved, a second of the pair of pointers pointing to a next block in the first DMA chain;
   a DMA engine configured to process successive operations in the first DMA chain, wherein the DMA engine tracks whether a conditional operation has already been executed by checking a consumption semaphore included in the corresponding conditional block;
   a period counter configured to track time remaining in an interval for processing the first DMA chain,
   wherein conditional operations are maintained in a second DMA chain of conditional blocks, each conditional block corresponding to a conditional operation and containing an estimate of the time needed to complete processing the conditional operation; and
   wherein the DMA engine executes a given conditional operation from the second DMA chain if the remaining time in the interval for processing the first DMA chain is greater than the estimated time to complete processing of the given conditional operation.

10. The apparatus according to claim 9, wherein a last block in the first DMA chain points to the second DMA chain.

11. The apparatus according to claim 9, wherein each block in the first DMA chain and the second DMA chain includes an exclusion semaphore for preventing the DMA engine from executing an operation associated with the block.

12. The apparatus according to claim 11, wherein if the DMA engine is prevented from executing an operation associated with a given block, the DMA engine repeatedly attempts to fetch the given block until the given block is reset.

13. The apparatus according to claim 11, wherein if the DMA engine is prevented from executing an operation associated with a given block, the DMA monitors a bus for any write to a location of the given block, and attempts to refetch the given block if such a write is detected.

14. The apparatus according to claim 9, wherein the period counter sets the length of the interval based on an application being executed.

15. The apparatus according to claim 9, wherein upon the expiration of the interval, the DMA engine begins processing a next scheduled DMA chain.

16. The apparatus according to claim 9, wherein a system processor monitors the second DMA chain and reclaims executed command blocks of the second DMA chain in order to supply conditional pointers to new conditional blocks.

* * * * *